Dec. 30, 1969    A. P. VERVAART ET AL    3,486,870
METHOD OF MANUFACTURING QUARTZ GLASS HOLLOW ARTICLES
Filed Dec. 1, 1966

INVENTORS
ADRIANUS P. VERVAART
ALFONSUS J. P. ANSEMS
BY

AGENT

United States Patent Office 3,486,870
Patented Dec. 30, 1969

3,486,870
IMPROVED METHOD OF MANUFACTURING QUARTZ GLASS HOLLOW ARTICLES
Adrianus P. Vervaart and Alfonsus Johannes Petrus Ansems, Emmasingel, Eindhoven, Netherlands, assignors, by mesne asisgnments, to U.S. Philips Corporation, New York, N.Y., a corporation of Delaware
Filed Dec. 1, 1966, Ser. No. 598,272
Claims priority, application Netherlands, Dec. 8, 1965, 6515921
Int. Cl. C03b 19/00
U.S. Cl. 65—32                                    1 Claim

ABSTRACT OF THE DISCLOSURE

A method for producing hollow quartz glass articles. A thin quartz glass tube is placed on a rotatable molybdenum or tungsten mandrel. Hydrogen or an equivalent inert atmosphere is introduced between the thin quartz glass tube and the mandrel surfaces. Quartz powder is atomized in a flame which is directed towards the surface of the rotating thin quartz tube thereby coating the tube periphery with molten quartz. The tube is also moved in a longitudinal direction with respect to the source of atomized quartz in order that the tube is completely covered with the molten quartz.

Figure 1:
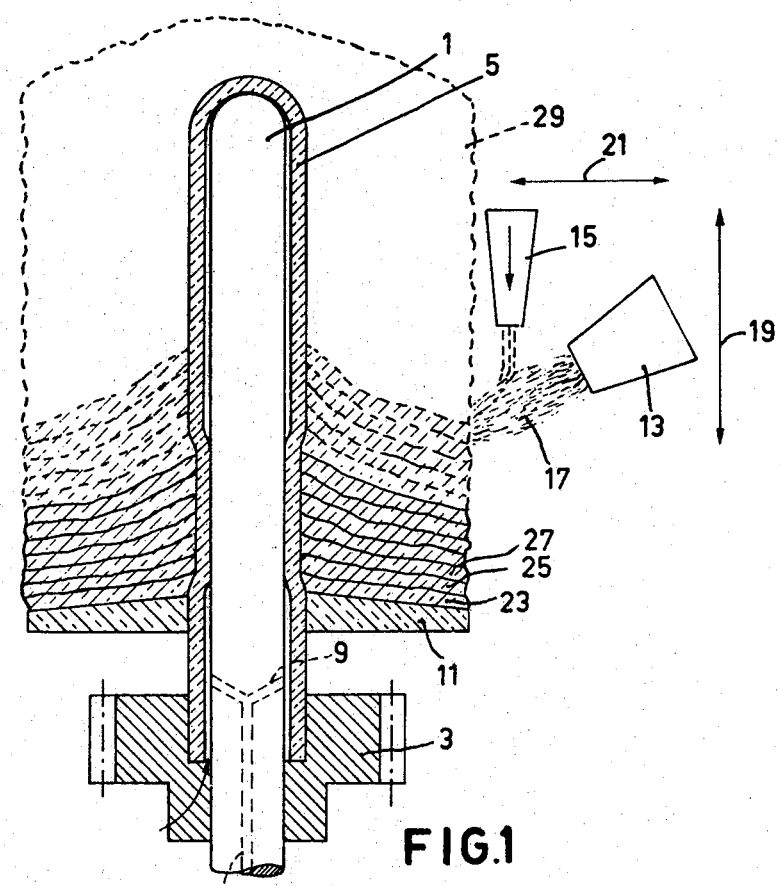

An alternative method is used wherein a pool of molten quartz is applied to the periphery of the tube at one position on the tube and the tube is elongated using the pool as the source of additional quartz for the elongation.

---

The invention is an improvement to the method of manufacturing a hollow article of quartz glass in which quartz powder is atomized through a flame to the surface of a rotating mandril, melts on this surface and forms there a quartz glass sheath which is removed from the mandril. Such a method is known.

In the known method, quartz powder is atomized in the flame of a suitable high temperature burner through the flow of gas to the surface of a rotating graphite mandril on which surface a quartz glass sheath is to be formed.

The formation of a quartz glass tube may be achieved, for example, by repeated reciprocal movement of the mandril in a longitudinal direction with respect to the burner so that the thickness of the sheath gradually increases. The mandril and the sheath are then cooled, whereupon the mandril can be readily removed. The hollow quartz glass mass thus obtained may be drawn out to form a long tube, if desired, by means of a suitable drawing process.

The formation of a quartz glass tube may be alternatively obtained by a different method in which the burner remains directed to one area of a rotating mandril. Thus, a sheath is formed along part of the length of the mandril only. The sheath is removed from the mandril in an axial direction. In spite of a further local supply of quartz glass, the thickness of the sheath does not increase.

The known methods have the disadvantage that the mandril is made of graphite the mechanical strength of which is comparatively small so that under certain conditions the mandril is liable to break. Besides, the surface of the quartz glass sheath removed from the mandril has a plurality of graphite parts which ultimately contaminate the product to be manufactured.

The object of the invention is to provide a method which avoids the above disadvantages.

The method in accordance with the invention is characterized in that the basic member is constituted by a mandril mainly consisting of tungsten or of molybdenum and which is surrounded at least along its operative length by an auxiliary tube of quartz glass. At high temperatures, for example, higher than the 1850° C. required for melting quartz glass powder, the mechanical properties of such a mandril of tungsten or molybednum are maintained. However, since a mandril of tungsten or molybdenum is readily oxidized at the high temperatures required for melting quartz glass, use is moreover made of an auxiliary tube of quartz glass which surrounds the mandril at least along the active part of its length.

In an embodiment of the method in accordance with the invention, the auxiliary tube is closed at one end, while its other open end is connected to a supply of a non-oxidizing gas, for example, hydrogen.

It should be noted that it is known to manufacture a solid rod of quartz glass by starting from a solid quartz glass mandril to which quartz powder is atomized and melted by means of the effect of a flame. It is not possible to obtain a hollow glass article by this method.

Figure 2:
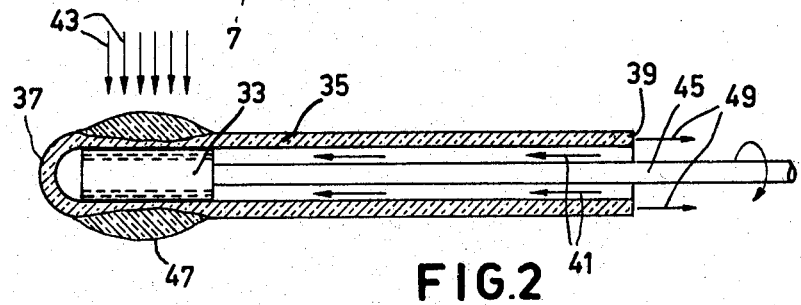

The invention will be described more fully with reference to the preferred embodiments thereof illustrated in the accompanying drawings, in which:

FIG. 1 relates to a method of manufacturing a hollow thick-walled quartz glass tube, while FIG. 2 relates to a method of manufacturing a long quartz glass tube having a comparatively small wall thickness.

Referring now to FIG. 1, reference numeral 1 designates a mandril of tungsten or molybdenum. This mandril 1 vertically arranged in a rotatable holder 3 is covered with a protecting auxiliary tube 5 of quartz glass which has a wall thickness of, for example, 4 mms. This auxiliary tube is closed at its upper end; its open lower end is connected to a supply of a non-oxidizing gas, for example, hydrogen. This gas is supplied through suitable bores 7, 9. Thus, the mandril 1 is protected from oxidation during operation of the device. A quartz glass disc 11 is melted and thereby adheres to the auxiliary tube 5. Reference numeral 13 denotes a burner producing very high temperatures (for example, of 1850° C.), while 15 designates a reservoir (shown diagrammatically) from which quartz glass powder can be introduced into the flames 17. The burner 13 and the reservoir 15 can be adjusted relative to one another both in a longitudinal direction as shown by the double arrows 19 and in a lateral direction as shown by the double arrows 21. During operation of the device, the rotatable holder 3 is displaced longitudinally with respect to the burner 13 and the reservoir 15. Quartz powder is atomized by means of the burner and deposited on the surface of the auxiliary tube 5 so that a layer 23 of melted quartz glass is formed on this surface. When the holder 3 and the burner 13 with the reservoir 15 are relatively displaced, a plurality of layers 25, 27 etc. are successively applied so that in course of time a quartz mass of comparatively large diameter is formed the volume of which is designated by 29 in FIG. 1. As a matter of course, the auxiliary tube 5 has melted and its inner diameter has conformed to the outer diameter of the mandril 1. Subsequently, the glass mass and the mandril are cooled. The mandril is detached from the glass mass by shrinkage and can be removed therefrom. The quartz mass thus obtained is hollow, has a very large wall thickness and can be shaped into a hollow quartz glass tube of greater length by means of a drawing process; this process is not described further.

FIG. 2 relates to a slightly different embodiment of the method in accordance with the invention. The basis member is constituted by a horizontally arranged mandril 33 which is likewise made of tungsten or molybdenum. Also in this case, the mandril is covered with a protecting auxiliary tube 35 of quartz glass which is closed at its lower end 37. The other end 39 is open and connected to a supply 41 of a non-oxidizing gas, for example, hydrogen. In this case also, the mandril is protected from oxidation. Quartz glass powder is atomized by means of a similar burner as shown in FIG. 1, to the surface of the auxiliary tube 35. In contradistinction to the situation of FIG. 1, the mandril 33 and the supply of the atomized quartz glass powder in the direction of arrows 43 are not relatively displaced. The mandril of tungsten or molybdenum is secured on a rotating rod 45 of great length. The manner in which this rod is set into rotation and in which the auxiliary tube 35 is connected to a supply of non-oxidizing gas is not further described for the sake of simplicity. In this method, quartz glass powder is first atomized in the flame to the auxiliary tube 35. Due to the heat supplied by the burner, the auxiliary tube 35 also melts at the area of the mandril 33 and surrounds this mandril with a tight fit. A pool of melted quartz glass is formed around the rotating mandril at the area which is denoted in the drawing by 47. After the pool has been formed, atomized quartz is constantly added thereto while at the same time the tube 35 can be drawn away from the mandril 33 in horizontal direction along the arrows 49. In course of time, the glass mass thus conducted away in horizontal direction is no longer supplied by the original auxiliary tube 35 but originates from the constantly replenished pool of melted quartz glass. This pool may extend throughout the length of the mandril.

Moreover, it has been found that when the mandril consists of tungsten or molybdenum, the accuracy to size of the inner diameter of the hollow glass article obtained by the method described is particularly great.

In the methods described hereinbefore, the mandril is arranged vertically in FIG. 1 and horizontally in FIG. 2. It should be appreciated that these positions are chosen only by way of example and that they may also be interchanged.

What is claimed is:
1. A method for making a hollow quartz glass article on a mandrel which is completely free from contamination by the mandrel, comprising the steps of:
   selecting a mandrel composed of a metal selected from the group consisting of tungsten and molybdenum;
   placing an auxiliary quartz glass tube, having a quartz glass disc around its outer wall, over said mandrel;
   introducing an inert gas between the glass tube and the mandrel to prevent oxidation of the mandrel;
   rotating the mandrel and glass tube thereon;
   directing a flame having a temperature of at least 1850° C. at the glass tube so as to melt same;
   atomizing quartz glass powder in the flame for deposition on the glass tube;
   displacing the rotating glass tube longitudinally with respect to the flame containing the atomized quartz glass powder; and
   depositing the quartz in layers on, and extending progressively upward from, the disc portion of the tube.

References Cited

UNITED STATES PATENTS

| 1,314,212 | 8/1919 | Quimby et al. | 65—144 |
| 1,597,293 | 8/1926 | Ruff | 65—18 |
| 2,545,728 | 3/1951 | Everett | 65—32 XR |
| 2,272,342 | 2/1942 | Hyde | 65—18 |

S. LEON BASHORE, Primary Examiner

J. H. HARMAN, Assistant Examiner

U.S. Cl. X.R.

65—18, 36, 144